United States Patent
Chavan et al.

(10) Patent No.: US 10,789,252 B2
(45) Date of Patent: Sep. 29, 2020

(54) EFFICIENT EVALUATION OF AGGREGATE FUNCTIONS

(71) Applicant: Oracle International Corporation, Redwood Shores, CA (US)

(72) Inventors: Shasank K. Chavan, Menlo Park, CA (US); Dennis Lui, San Jose, CA (US); Allison L Holloway, San Carlos, CA (US); Sheldon A. K. Lewis, Jallisco (MX)

(73) Assignee: Oracle International Corporation, Redwood Shores, CA (US)

( * ) Notice: Subject to any disclaimer, the term of this patent is extended or adjusted under 35 U.S.C. 154(b) by 168 days.

(21) Appl. No.: 15/702,526

(22) Filed: Sep. 12, 2017

(65) Prior Publication Data

US 2018/0075113 A1    Mar. 15, 2018

Related U.S. Application Data

(60) Provisional application No. 62/393,181, filed on Sep. 12, 2016.

(51) Int. Cl.
*G06F 16/2455* (2019.01)
*G06F 16/22* (2019.01)
(Continued)

(52) U.S. Cl.
CPC ...... *G06F 16/24564* (2019.01); *G06F 16/221* (2019.01); *G06F 16/2237* (2019.01);
(Continued)

(58) Field of Classification Search
CPC ........... G06F 16/24564; G06F 16/2456; G06F 16/24537; G06F 16/2462; G06F 16/2455;
(Continued)

(56) References Cited

U.S. PATENT DOCUMENTS 9,251,210 B2   2/2016   Chaudhry et al.
9,916,352 B2   3/2018   Chaudhry et al.
(Continued)

OTHER PUBLICATIONS

Christian Lemke et al., "Speeding Up Quries in Column Stores a Case for Compression", dated Sep. 2, 2010, 13 pages.
(Continued)

*Primary Examiner* — Albert M Phillips, III
(74) *Attorney, Agent, or Firm* — Hickman Palermo Becker Bingham LLP

(57) ABSTRACT

Techniques related to efficient evaluation of aggregate functions are disclosed. Computing device(s) may perform a method for aggregating results of performing a multiplication on a first column and a second column of a database table. A first vector stores a subset of values of the first column. A second vector stores a corresponding subset of values of the second column. When it is determined that the first vector has a lower cardinality than the second vector, a third vector stores at least a first distinct value and a second distinct value of the first vector. A first set of one or more values of the second vector is determined, wherein each value of the first set of one or more values corresponds to the first distinct value in the first vector. A first multiplicand is generated based on performing a summation over the first set of one or more values.

22 Claims, 9 Drawing Sheets

(51) Int. Cl.
*G06F 16/2458* (2019.01)
*G06F 16/2453* (2019.01)
*G06F 9/30* (2018.01)
*G06F 9/38* (2018.01)

(52) U.S. Cl.
CPC ...... *G06F 16/2282* (2019.01); *G06F 16/2455* (2019.01); *G06F 16/2456* (2019.01); *G06F 16/2462* (2019.01); *G06F 16/24537* (2019.01); *G06F 9/30018* (2013.01); *G06F 9/30036* (2013.01); *G06F 9/3887* (2013.01)

(58) Field of Classification Search
CPC ............. G06F 16/2282; G06F 16/2237; G06F 16/221; G06F 9/30036; G06F 9/30018; G06F 9/3887
See application file for complete search history.

(56) References Cited

U.S. PATENT DOCUMENTS

| 2007/0174825 | A1* | 7/2007 | Eichenberger | ...... G06F 9/30032 717/140 |
|---|---|---|---|---|
| 2009/0249026 | A1* | 10/2009 | Smelyanskiy | ...... G06F 9/30032 712/4 |
| 2012/0078880 | A1 | 3/2012 | Steven et al. | |
| 2015/0088926 | A1* | 3/2015 | Chavan | ................. G06F 16/221 707/769 |
| 2015/0089134 | A1 | 3/2015 | Mukherjee | |
| 2016/0070726 | A1 | 3/2016 | Macnicol et al. | |
| 2016/0147833 | A1 | 5/2016 | Chaudhry et al. | |
| 2017/0060587 | A1* | 3/2017 | Chavan | ............... G06F 9/30036 |
| 2018/0075096 | A1 | 3/2018 | Chavan | |
| 2019/0102412 | A1 | 4/2019 | Macnicol et al. | |

OTHER PUBLICATIONS

KD Nuggets, "Apache Arrow and Apache Parquet: Why We Needed Different Projects for Columnar Data, on Disk and In-Memory", www.kdnuggets.com/2017/02/apache-arrow-parquet-columnar-data, Feb. 2017, 8pgs.

Abadi et al., "Integrating Compression and Execution in Column-Oriented Database Systems", SIGMOD 2006, Jun. 27-29, 2006, Chicago, Illinois, USA. Copyright 2006 ACM, 12 pages.

Kemper, "Optimizing Disjunctive Queries with Expensive Predicates" dated 1994, pp. 336-347.

* cited by examiner

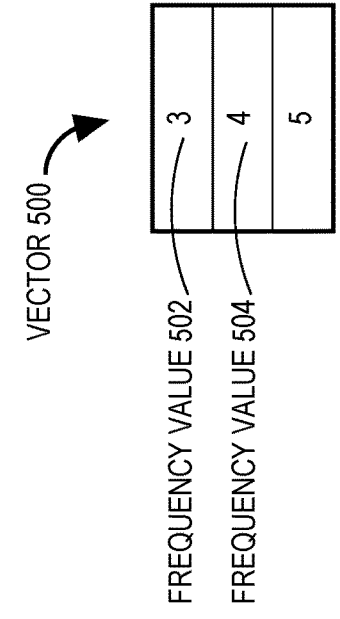
FIG. 6B
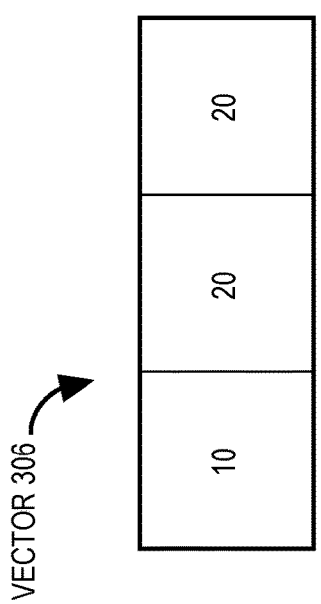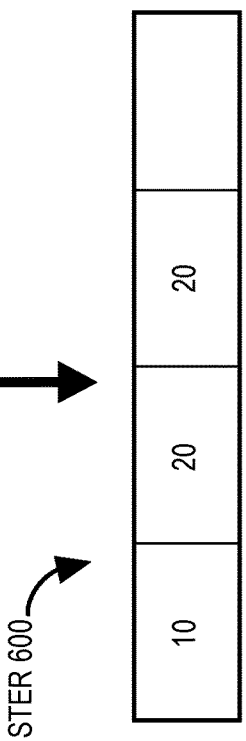
FIG. 6A

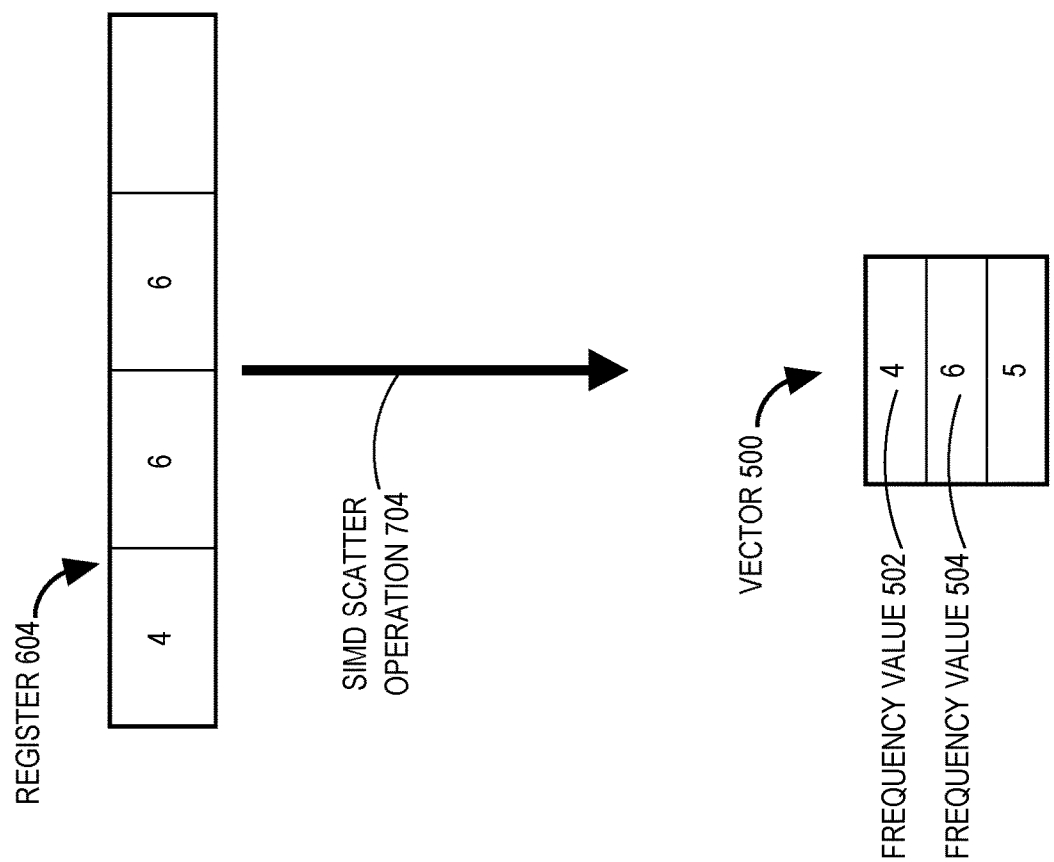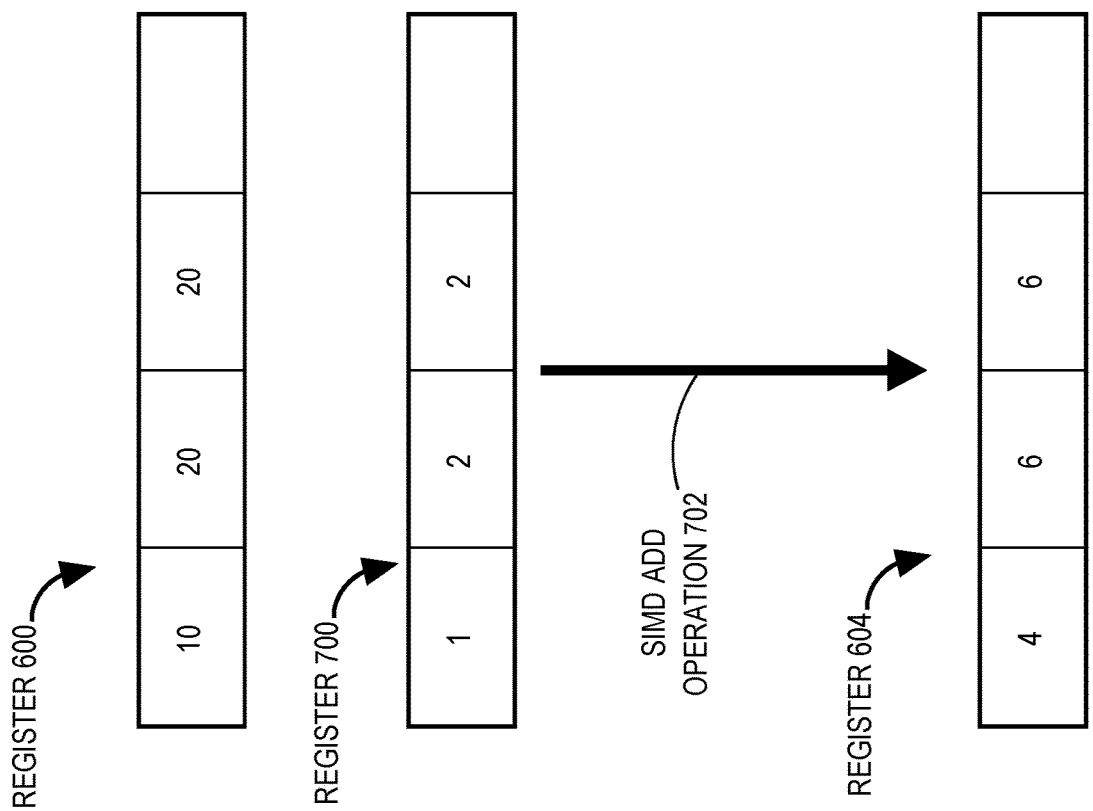

EFFICIENT EVALUATION OF AGGREGATE FUNCTIONS

CROSS-REFERENCE TO RELATED APPLICATIONS; BENEFIT CLAIM

This application claims the benefit of Provisional Appln. 62/393,181, filed Sep. 12, 2016, the entire contents of which is hereby incorporated by reference as if fully set forth herein, under 35 U.S.C. § 119(e). This application is related to U.S. patent application Ser. No. 15/702,659 titled "EFFICIENT EVALUATION OF QUERY EXPRESSIONS INCLUDING GROUPING CLAUSES" and U.S. patent application Ser. No. 15/702,431 titled "EFFICIENT EVALUATION OF QUERIES WITH MULTIPLE PREDICATE EXPRESSIONS", both of which are filed on Sep. 12, 2017, the entire contents of both of which are hereby incorporated by reference for all purposes as if fully set forth herein. This application is further related to Provisional Application No. 61/709,142 filed Oct. 2, 2012; U.S. patent application Ser. No. 14/023,064 filed Sep. 10, 2013; U.S. Pat. No. 9,697,174 issued Jul. 4, 2017; U.S. patent application Ser. No. 14/270,117 filed May 5, 2014; Provisional Application No. 61/801,207 filed Mar. 15, 2013, the entire contents of each of which are hereby incorporated by reference as if fully set forth herein.

TECHNICAL FIELD

Embodiments are generally related to information storage and retrieval technology. More specifically, embodiments are related to efficient evaluation of aggregate functions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Columnar Database Data

To enable efficient evaluation of database queries, database tables may be stored in a column-major format. Database tables stored in this way are referred to herein as "columnar database data". In column-major format, a column for a subset of rows in a database table are stored contiguously (within a memory address space) within a column vector. As used herein, a column vector refers to a vector that stores one or more values of a column, including one or more values of another column vector. Referring to FIG. 1, database table 100 comprises columns 102-104. Column vectors 106-112 store subsets of columns 102-104.

Columnar database data enables efficient processing of database data. Because the column values of a column are stored contiguously in memory, many kinds of database operations may be performed efficiently. For example, to evaluate a predicate based on a column, the column values may be retrieved more efficiently when stored contiguously in memory.

Compression

Typically, columnar database data is stored in a compressed format to conserve space in memory. Any number of various compression techniques may be used. Columnar database data may be stored inline with frequency values that can be used to compress and/or decompress the columnar database data. For example, run-length encoding is a lossless compression technique that can be used to store "AAAAA" as "5A", where the "5" indicates the length of the "run" of "A"s.

Additionally or alternatively, columnar database data may be stored separately from a dictionary that can be used to compress and/or decompress the columnar database data. Dictionary encoding is a lightweight compression technique that enables data to be stored using a relatively small number of bits. The relatively small number of bits corresponds to an encoded representation of the data and is hereinafter referred to as a "token". Encoding and decoding are enabled based on maintaining a dictionary, which maps tokens to data represented by the tokens and vice versa. As used herein, an encoding dictionary encodes a domain of values for a column, a part of a column, or a column vector. Unless otherwise indicated, when it is said that a dictionary is for/associated with/corresponds to a column/a part of a column/a column vector, the domain of values of the dictionary are the values in the column/the part of the column/ the column vector.

Referring to FIG. 2, dictionary 200 corresponds to column vector 106. Dictionary 200 comprises tokens 204 and represented data 206. Tokens 204 correspond to the distinct values of column vector 106. Represented data 206 include decoded representations of these distinct values. In other words, dictionary 200 encodes a domain of values comprising represented data 206. For example, instead of storing "10000", column vector 106 stores "10", thereby conserving space in memory. Although, for the sake of clarity and ease of explanation, represented data 206 is depicted as a small datatype having only five significant digits, in reality, represented data 206 is typically a very large datatype, such as ORACLE's number datatype, which can have up to thirty-eight significant digits.

Aggregate Functions

Many database queries involve aggregate functions for summarizing data stored in one or more columns. Examples of aggregate functions include min( ), max( ), distinct( ), sum( ), count( ), average( ), and/or the like.

When database data is maintained in row-major format, aggregate functions are typically evaluated one row at a time. For example, performing a summation over a billion rows may involve a billion iterations of fetch, add, and store operations. However, this approach is suboptimal for columnar database data, because some advantages of maintaining data in a column-major format would be negated. In other words, computing an aggregate function in this manner may result in a very slow process. Additionally, any need to decompress data further slows performance. For example, performing a summation over a billion rows that each include encoded data may also involve a billion decoding operations. Thus, precious clock cycles may be inefficiently used to perform repetitive operations.

BRIEF DESCRIPTION OF THE DRAWINGS

In the drawings:

FIG. 6A depicts an example single instruction, multiple data (SIMD) "load" operation.

FIG. 6B depicts an example SIMD "gather" operation.

FIG. 7A depicts an example SIMD "add" operation.

FIG. 7B depicts an example SIMD "scatter" operation.

Figure 1:
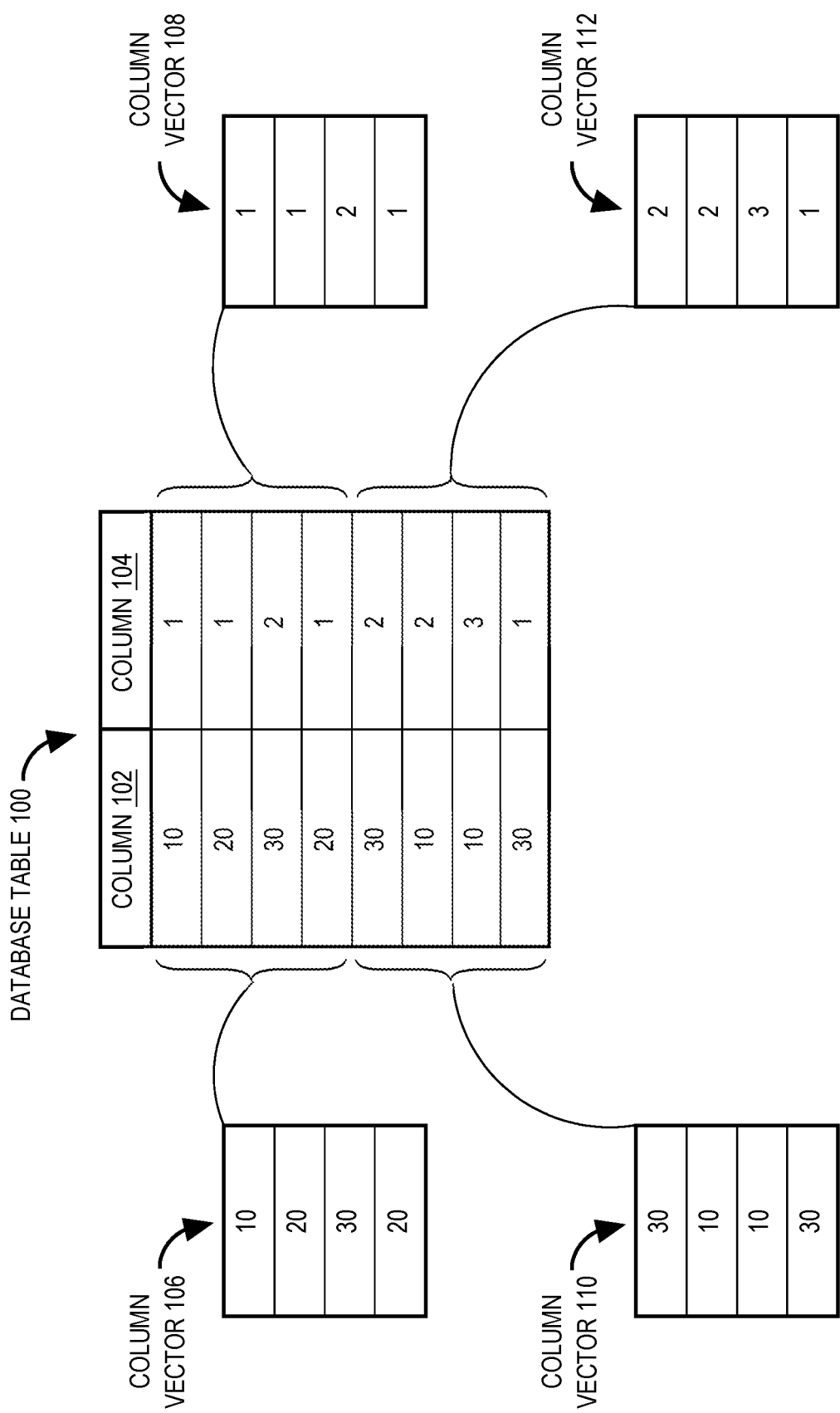
FIG. 1 depicts example columnar database data.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

INTRODUCTION

The computational overhead involved in evaluating an aggregate function over columnar database data may be reduced based on any number of various techniques that take advantage of the column-major format used to contiguously store, in a vector, a plurality of values from the same column. Depending on whether an aggregate function is to be evaluated over a single column or a combination of columns, different techniques may be used.

Evaluating an aggregate function over a single column may involve leveraging the frequencies of distinct column values. At a high level, this involves performing a multiplication operation instead of a multitude of addition operations. More specifically, each distinct value of a vector may be multiplied to a respective frequency with which that distinct value appears in the vector. Assume for the sake of illustration that A is a vector storing the set of column values {1, 4, 1, 4, 4}. Sum(A) may be evaluated based on the expression "2*1+3*4" instead of the expression "1+4+1+4+4", thereby reducing the number of addition operations involved.

To evaluate an aggregate function over a combination of columns, the cardinality of at least one of the columns or column vectors may be leveraged. At a high level, when the columns are combined based on a multiplication operation, this technique uses the Distributive Property of Multiplication to reduce the number of multiplication operations. More specifically, each distinct value of a column or column vector having a lower cardinality becomes a factor that is multiplied to a respective set of corresponding values from a column or column vector having a higher cardinality. Assume for the sake of illustration that A corresponds to a vector storing the set of column values {1, 2, 1, 2, 2} and that B corresponds to a vector storing the set of column values {3, 4, 5, 4, 3}. A has the two distinct values "1" and "2", whereas B has the three distinct values "3", "4", and "5". Since A has the lower cardinality, sum(A*B) may be evaluated based on the expression "1*(3+5)+2*(4+4+3)". Compared to the expression "1*3+2*4+1*5+2*4+2*3", a reduction in the number of multiplication operations is achieved.

Cardinality

Generally speaking, cardinality refers to the number of distinct elements in a set. In the context of columnar database data, cardinality refers to the number of distinct values in a particular column or a subset thereof. Referring again to FIG. 2, column vector 106 has a cardinality of three, because column vector 106 includes three distinct values: "10", "20", and "30". In contrast, column vector 108 has a cardinality of two, because column vector 108 includes two distinct values—"1" and "2".

Figure 2:
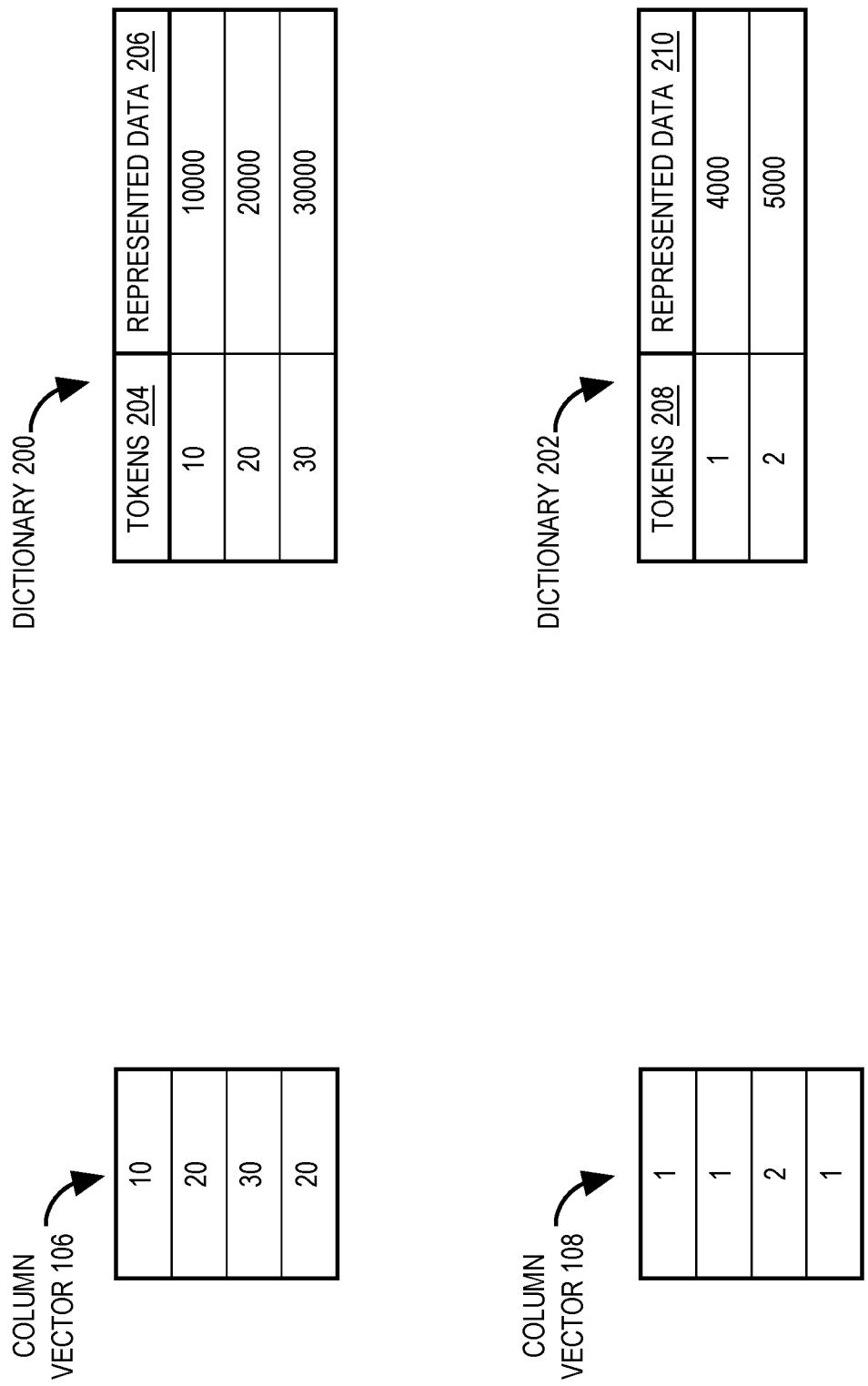
FIG. 2 depicts example data dictionaries.

Cardinality may be determined based on evaluating the aggregate function distinct( ) over a particular column or a subset thereof. However, a more efficient approach for determining cardinality may involve referring to an encoding dictionary. Referring to FIG. 2, dictionaries 200-202 correspond to column vectors 106-108, respectively. Dictionary 200 has three entries, thereby indicating that column vector 106 has a cardinality of three. In contrast, dictionary 202 has two entries, thereby indicating that column vector 108 has a cardinality of two.

Leveraging cardinality enables efficiently aggregating the results of performing an operation on multiple columns of a database table. For example, a database query may include the query expression sum(A*B) where A and B correspond to a first column and a second column, respectively. Referring to FIG. 2, column vector 106 stores a subset of values of A, and column vector 108 stores a subset of values of B. For the sake of clarity and ease of reference, column vector 106 is hereinafter referred to as column vector A, and column vector 108 is hereinafter referred to as column vector B. The values of column vector A correspond to the values of column vector B in that the values are multiplied to each other according to the aforementioned query expression. Thus, a row-based approach for evaluating the aforementioned query expression over column vectors A and B would involve the following computations: 10*1+20*1+30*2+20*1. Notably, there are n multiplications and n−1 additions, where n is the number of rows or values in each vector. Advantageously, leveraging cardinality enables reducing the number of multiplications based on the Distributive Property of Multiplication. In other words, leveraging cardinality enables evaluating the aforementioned query expression as follows: 1*(10+20+20)+2*(30), where the factors "1" and "2" are the distinct values of column vector B. Notably, the computational overhead attributed to performing multiplication operations has been reduced based on limiting the number of multiplication operations to the number of distinct values in the column or column vector having the lowest cardinality.

Thus, an approach that leverages cardinality involves determining which column or column vector has the lowest cardinality. This can be efficiently achieved based on comparing sizes of the encoding dictionaries associated with the columns or column vectors in question. Referring to FIG. 2, dictionary 202 has a smaller number of entries than dictionary 200. Accordingly, it can be determined that column vector B has a lower cardinality than column vector A.

Figure 3:
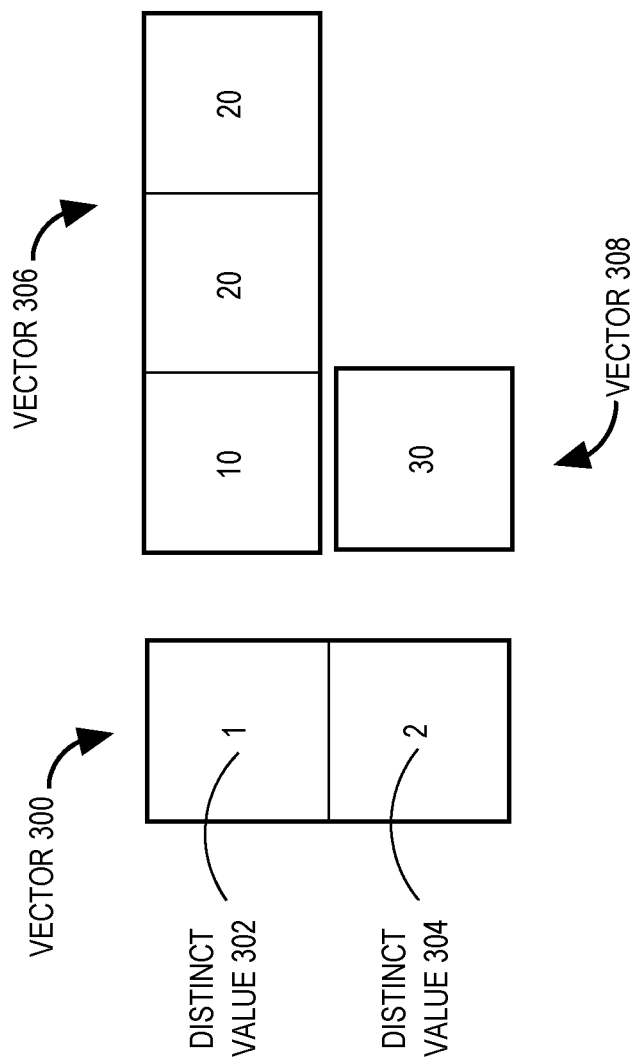
FIG. 3 depicts an example approach for evaluating an aggregate function over multiple columns.

When the column or column vector having the lowest cardinality is determined, each distinct value of that column or column vector is stored once in a separate vector. Referring to FIG. 3, distinct values 302-304 of column vector B are stored in vector 300. In some embodiments, distinct values 302-304 are simply loaded into vector 300 from dictionary 202, which already stores distinct values in a deduplicated format.

For each distinct value of vector 300, a respective vector may store a set of one or more values that are to be multiplied to that distinct value. Referring to FIG. 3, vector 306 stores three values of column vector A that are to be multiplied to distinct value 302, and vector 308 stores a value of column vector A that is to be multiplied to distinct value 304. As will be described in greater detail below, one or more bit masks may be used to determine which values of column vector A are to be multiplied to which distinct values of column vector B.

Prior to being multiplied with a respective distinct value of column vector B, each set of one or more values of column vector A may be aggregated into a multiplicand. For example, a respective summation may be performed over each set of one or more values based on any number of various techniques described in greater detail below. In some embodiments, generating a multiplicand involves decompressing one or more values that are to be aggregated. Referring to FIG. 3, the encoded values of vector 306 are decoded using dictionary 200, and the decoded values are added together to generate the multiplicand "50000".

Each distinct value of vector 300 is then multiplied to a respective multiplicand to generate an addend. In some embodiments, generating an addend involves decompressing one or more values that are to be multiplied. Referring to FIG. 3, the encoded distinct values 302-304 are decoded using dictionary 202, and the encoded value of vector 308 is decoded into the multiplicand "30000" using dictionary 200. Thus, the first addend "200000000" is generated based on multiplying decoded distinct value 302 "4000" with the multiplicand "50000" of vector 306, and the second addend "150000000" is generated based on multiplying decoded distinct value 304 "5000" with the decoded multiplicand "30000" of vector 308.

Notably, leveraging cardinality enables deferring decompression of distinct values 302-304 until performance of the multiplication operations, thereby reducing computational overhead. Using a row-based approach, n decompressions would have been necessary to perform operations on the values of column vector B, where n is the number of rows or values in column vector B. In contrast, deferring decompression reduces the number of decompressions to m, where m is the number of distinct values in column vector B.

An approach that leverages cardinality also involves aggregating addends. For example, addends may be stored in a vector, and a summation may be performed over the addends in the vector. Continuing with the previous example, vector 300 may be updated with the addends "200000000" and "150000000", which are aggregated into the result "350000000" of evaluating sum(A*B). In some embodiments, the summation may be performed using any number of various techniques described in greater detail below.

Bit Mask

Figure 4:
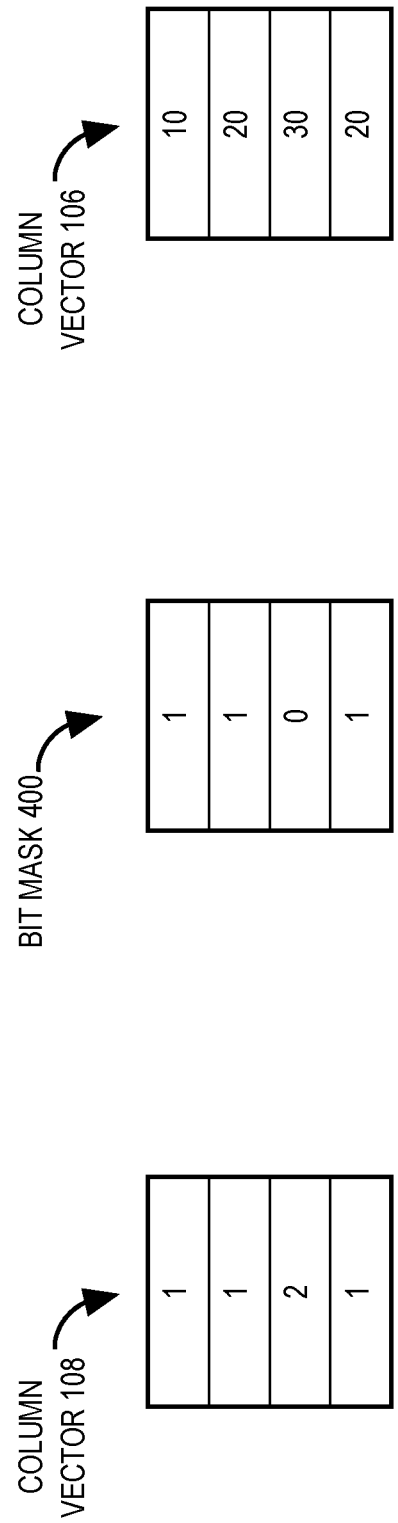
FIG. 4 depicts an example approach for filtering columnar database data based on a bit mask.

As mentioned above, for each distinct value of vector 300, a respective vector may store a set of one or more values that are to be multiplied to that distinct value. Determining which values of column vector A to include in a particular set may be based on a bit mask. Referring to FIG. 4, bit mask 400 is used to determine which values of column vector A correspond to a particular distinct value of column vector B. Each bit set to "1" in bit mask 400 indicates that a corresponding value of column vector A is to be included in a set of one or more values that are to be multiplied to the distinct value "1" of column vector B. Thus, values of column vector A that have been filtered by bit mask 400 may be concurrently scanned and loaded into vector 306. Thereafter, a summation may be performed over vector 306.

In some embodiments, instead of scanning and simply loading filtered values of column vector A into vector 306, the filtered values are concurrently scanned and accumulated into vector 306. In other words, vector 306 would store a single value—a running sum—that is updated as filtered values of column vector A are scanned. For example, at time T1, vector 306 stores "10000"; at time T2, vector 306 stores "30000"; and at time T3, vector 306 stores "50000". To enable aggregation while scanning, decompression may be performed prior to the scanning.

In some embodiments, column values that have been filtered by bit mask 400 are concurrently scanned while performing a SIMD operation. New SIMD instruction sets enable scanning columnar database data filtered by a bit mask. For example, INTEL's AVX-512 instruction set supports vector operations using mask bits. The mask bits allow SIMD operations to apply only to values with corresponding bits set in a mask. Most vector instructions in AVX-512 support masked operations. For example, the instruction "load_812(void*addr, unsigned long Mask)" can be used to apply a bit mask to a vector to determine which values of the vector to load.

Referring to FIG. 4, since there are only two distinct values in column vector B, bit mask 400 may also be used to determine which values of column vector A correspond to the distinct value "2" of column vector B. However, if there were more than two distinct values in column vector B, multiple bit masks may be used to determine which values of column vector A to include in which sets.

Bit mask 400 is generated based on scanning column vector B and setting each bit in bit mask 400 that corresponds to a particular distinct value of column vector B. Bit mask 400 is indexed to the values of column vector B. Thus, if the first value of column vector B is a "1", the first bit of bit mask 400 is set. Otherwise, the first bit of bit mask 400 remains unset.

Frequency Value Vector

As mentioned above, a summation may be performed over a column vector. However, in some embodiments, the column vector may include duplicate values. In such embodiments, it may be more efficient to perform the summation based on leveraging a respective frequency value of each distinct value having multiple instances in the column vector. For example, if the column vector stores the values "100", "200", "200", "100", and "200", simply adding these values would involve n−1 addition operations, where n is the number of values stored in the column vector. In contrast leveraging frequency values would reduce the number of addition operations to m−1, where m is the number of distinct values in the column vector. In other words, 100+200+200+100+200 would be more efficiently evaluated as 2*100+3*200, where "2" and "3" are the frequency values of "100" and "200", respectively.

Figure 5:
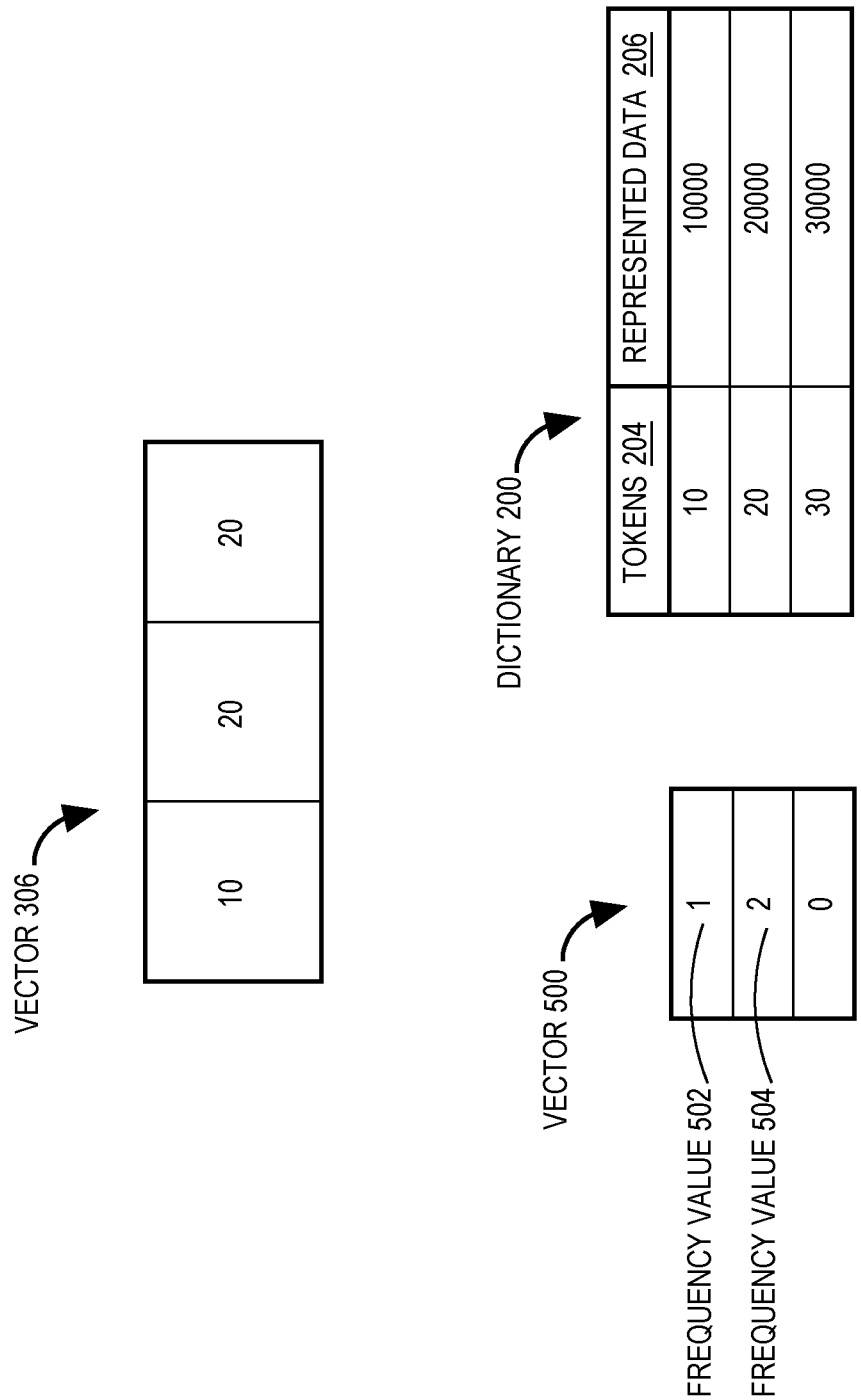
FIG. 5 depicts an example frequency value vector.

An approach that leverages frequency values may involve generating a frequency value vector that stores a respective cumulative frequency value for each distinct value of the column vector. Referring to FIG. 5, vector 500 is a frequency value vector that stores frequency values 502-504 corresponding to the distinct values "10" and "20", respectively, of vector 306. In some embodiments, the frequency value vector is indexed to the entries of an encoding dictionary. Referring to FIG. 5, dictionary 200 is the data dictionary for column vector A. Since vector 306 is a subset of column vector A, dictionary 200 may be used to index a frequency value vector 500 for vector 306. Any distinct value absent from vector 306 may correspond to a frequency value of "0" in vector 500.

Each frequency value indicates a respective number of instances of a corresponding value in the column vector. Referring to FIG. 5, frequency value 502 indicates that the value "10" appears once in vector 306, and frequency value 504 indicates that the value "20" appears twice in vector 306. In some embodiments, frequency values are initialized to "0" and updated as the column vector is scanned.

Thus, to evaluate the sum of the values in the column vector, each frequency value is multiplied to a respective distinct value of the column vector to generate a product. In some embodiments, generating products involves decompressing the distinct values of the column vector. Referring to FIG. 5, frequency value 502 is multiplied to "10000", and frequency value 504 is multiplied to "20000".

Notably, leveraging frequency values enables minimizing decompression such that each distinct value of the column vector is decompressed only once. For example, a less efficient approach for performing a summation over vector 306 would involve three decompressions—one decompression for each of the three values "10", "20", and "20". In contrast, frequency value vector 500 enables reducing the number of decompressions to two—one for each of the distinct values "10" and "20". In some embodiments, a bit mask may be used to decompress only the distinct values that correspond to non-zero frequency values.

An approach that leverages frequency values also involves aggregating the generated products. For example, the generated products may be stored in a vector, and a summation may be performed over the generated products in the vector. In some embodiments, the summation may be performed using any number of various techniques described herein.

SIMD Instruction Set

As mentioned above, an approach that leverages frequency values may involve generating a frequency value vector. In some embodiments, a frequency value vector is efficiently generated based on parallelization techniques, such as SIMD operations. Iterations of SIMD operations are especially useful for quickly generating a frequency value vector for a large number of values. FIGS. 6A-B and 7A-B depict an example iteration involving four SIMD operations: "load", "gather", "add", and "scatter". Notably, the SIMD "scatter" operation is an instruction in INTEL's AVX-512 instruction set.

The SIMD "load" operation is used to store at least a subset of a particular vector into a first register. The particular vector is a vector over which a summation is to be performed, and each subset includes as many values as will fit into the first register. Referring to FIG. 6A, register 600 can accommodate up to four values at a time. In this particular iteration, there are only three values in vector 306, so SIMD load operation 602 concurrently loads the three values into register 600 and leaves the last portion of register 600 empty. Any SIMD operations performed on the last portion would be a "no operation" or a NOP for short.

The SIMD "gather" operation is used to store running frequency values into a second register. The running frequency values are fetched from a frequency value vector. For a particular iteration, each running frequency value that is fetched corresponds to a respective value stored in the first register. Referring to FIG. 6B, vector 500 is a frequency value vector storing the running frequency values 502-504 "3" and "4", respectively. Frequency values 502-504 respectively correspond to the distinct values "10" and "20" stored in register 600. SIMD gather operation 606 stores frequency value 502 in the first portion of register 604 and stores frequency value 504 in the second and third portions of register 604 such that the relative position of each frequency value in register 604 corresponds to the relative position of a respective value in register 600.

The SIMD "add" operation is used to update one or more running frequency values in the second register. In some embodiments, the second register is updated based on a third register that stores a respective frequency value for each value loaded into the first register. Thus, the one or more running frequency values in the second register may be updated based on adding them to one or more frequency values in the third register.

Referring to FIG. 7A, register 700 stores a respective frequency value for each value of register 600. In other words, the frequency value "1" corresponds to the value "10", and the frequency value "2" corresponds to the value "20". SIMD add operation 702 updates register 604 with the frequency values of register 700. Thus, the frequency values "1", "2", and "2" are added to the running frequency values "3", "4", and "4" to generate the updated running frequency values "4", "6", and "6".

In some embodiments, the frequency values are determined based on scanning register 600. In some embodiments, the values of register 600 are run-length encoded, so each value may be preceded by a run-length that can be stored in register 700 as a frequency value. In some embodiments, run-length encoded values of register 600 may be expanded out and traversed to compute frequency values.

Referring to FIG. 7A, register 700 stores the same frequency value "2" for each instance of the value "20" in register 600. As will be described below, this enables concurrency without affecting consistency.

The SIMD "scatter" operation stores the updated running frequency values into the frequency value vector. Referring to FIG. 7B, SIMD scatter operation 704 takes the updated running frequency values of register 604 and stores them in frequency value vector 500. Although register 700 stores two instances of the frequency value "2", frequency value vector 500 stores only one instance of the frequency value "2". However, because the two instances of the frequency value "2" in register 700 are identical, the two instances may be stored in frequency value vector 500 in any order, thereby avoiding a race condition.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
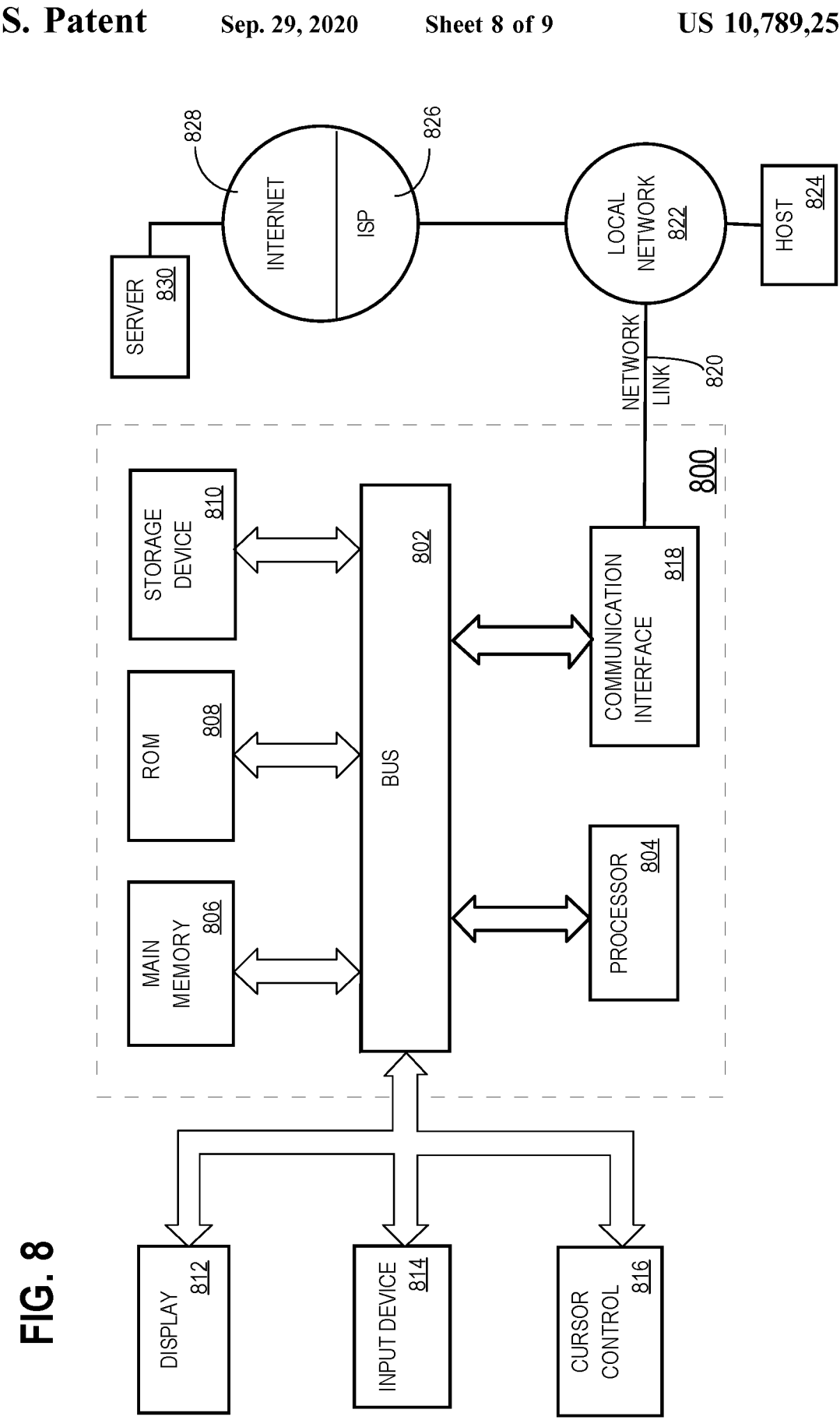
FIG. 8 depicts a computer system upon which embodiments may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
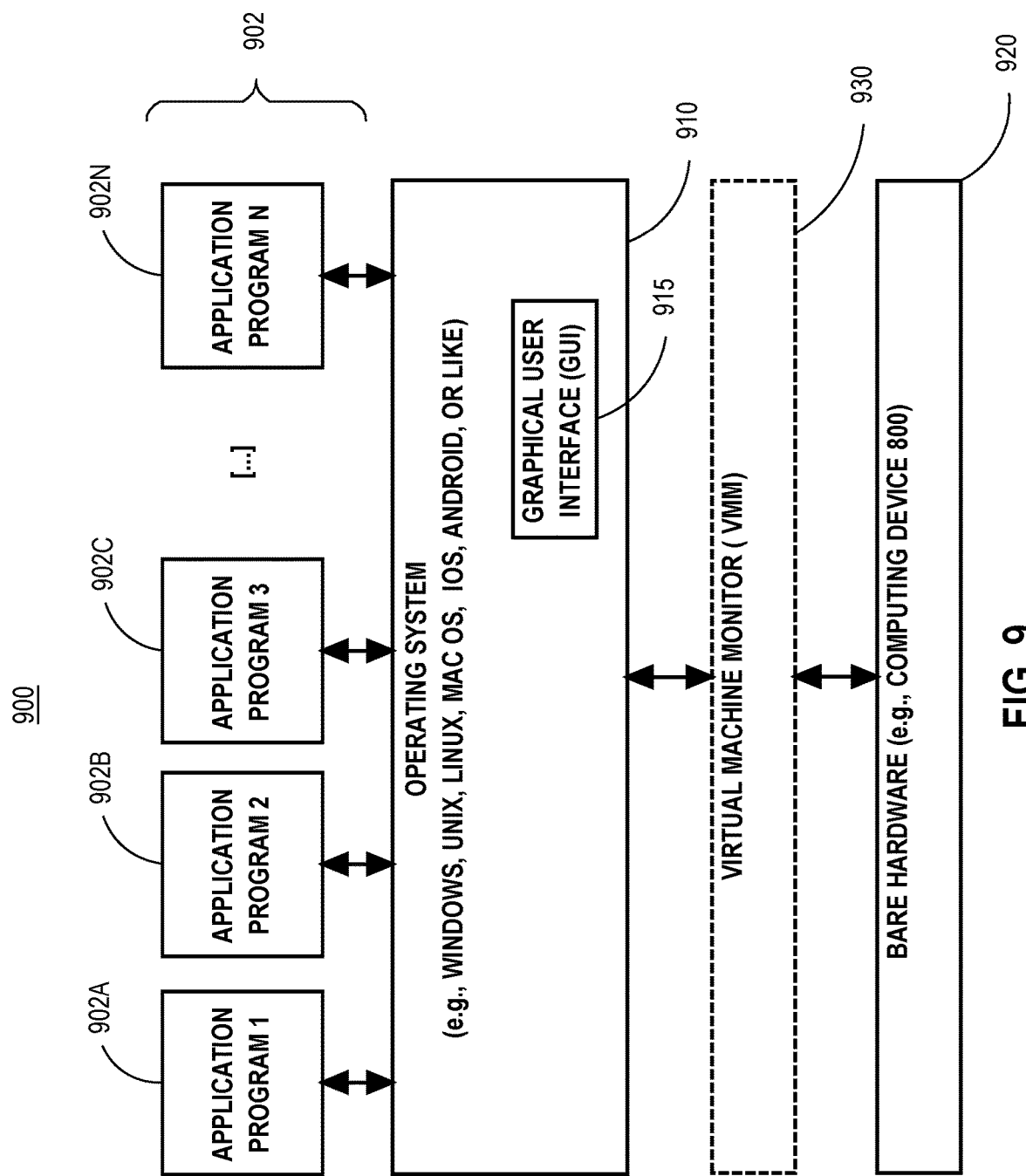
FIG. 9 depicts a software system for controlling the operation of the computer system.

FIG. 9 is a block diagram of a software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 800. The applications or other software intended for use on system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of system 900. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for aggregating results of performing a multiplication operation on a first column and a second column of a database table, the method comprising:
    storing, in a first vector, a subset of values of the first column;
    storing, in a second vector, a corresponding subset of values of the second column;
    determining that the first vector has a lower cardinality than the second vector;
    storing at least a first distinct value and a second distinct value of the first vector that each correspond to a distinct value in said first vector;
    determining a first set of one or more values of the second vector, wherein each value of the first set of one or more values corresponds to the first distinct value;
    performing a single instruction, multiple data (SIMD) load operation, that loads, into a first register, the first set of one or more values of the second vector;
    generating a first multiplicand based on performing a summation over the first set of one or more values in the first register;
    generating a first addend based on performing a multiplication operation on the first multiplicand and the first distinct value;
    determining a second set of one or more values of the second vector, wherein each value of the second set of one or more values corresponds to the second distinct value;

performing a SIMD load operation, that loads, into a second register, the second set of one or more values of the second vector;

generating a second multiplicand based on performing a summation over the second set of one or more values in the second register;

generating a second addend based on performing a multiplication operation on the second multiplicand and the second distinct value;

performing a summation over at least the first addend and the second addend; and wherein the method is performed by one or more computing devices.

2. The method of claim 1, wherein determining that the first vector has a lower cardinality than the second vector comprises determining a dictionary for the first vector has a smaller number of entries than a dictionary for the second vector.

3. The method of claim 1, wherein the method further includes loading the first distinct value from a dictionary for the first vector and loading the second distinct value from said dictionary.

4. The method of claim 3, wherein loading the first distinct value includes loading the first distinct value after generating the first multiplicand.

5. The method of claim 1, wherein determining the first set of one or more values of the second vector comprises generating a bit mask that indicates which values of the second vector correspond to the first distinct value in the first vector.

6. The method of claim 1, wherein performing the summation over the first set of one or more values comprises:

loading, into a fourth vector, each value of the first set of one or more values;

performing a summation over the fourth vector.

7. The method of claim 1, wherein performing the summation over the first set of one or more values comprises accumulating, in a fourth vector, a running sum of the first set of one or more values.

8. The method of claim 1, wherein performing the summation over the first set of one or more values comprises:

storing, in a fifth vector, a respective frequency value for each distinct value of the first set of one or more values, wherein a frequency value indicates a number of instances of a particular value in the first set of one or more values;

generating a set of one or more products based on multiplying each distinct value of the first set of one or more values to a corresponding frequency value of the fifth vector;

performing a summation over the set of one or more products.

9. The method of claim 8, wherein storing, in the fifth vector, a respective frequency value for each distinct value of the first set of one or more values comprises:

performing a SIMD gather operation that retrieves, into a third register, a respective running frequency value for each value of multiple values loaded into the first register;

performing a SIMD add operation that updates one or more running frequency values in the third register with one or more frequency values for the multiple values loaded into the first register;

performing a SIMD scatter operation that stores, in the fifth vector, the one or more running frequency values updated in the third register.

10. One or more non-transitory storage media storing instructions which, when executed by one or more computing devices, cause performance aggregating results of performing a multiplication operation on a first column and a second column of a database table by causing at least:

storing, in a first vector, a subset of values of the first column;

storing, in a second vector, a corresponding subset of values of the second column;

determining that the first vector has a lower cardinality than the second vector;

storing at least a first distinct value and a second distinct value of the first vector that each correspond to a distinct value in said first vector;

determining a first set of one or more values of the second vector, wherein each value of the first set of one or more values corresponds to the first distinct value;

performing a single instruction, multiple data (SIMD) load operation, that loads, into a first register, the first set of one or more values of the second vector;

generating a first multiplicand based on performing a summation over the first set of one or more values in the first register;

generating a first addend based on performing a multiplication operation on the first multiplicand and the first distinct value;

determining a second set of one or more values of the second vector, wherein each value of the second set of one or more values corresponds to the second distinct value;

performing a SIMD load operation, that loads, into a second register, the second set of one or more values of the second vector;

generating a second multiplicand based on performing a summation over the second set of one or more values in the second register;

generating a second addend based on performing a multiplication operation on the second multiplicand and the second distinct value; and performing a summation over at least the first addend and the second addend.

11. The one or more non-transitory storage media of claim 10, wherein determining that the first vector has a lower cardinality than the second vector comprises determining a dictionary for the first vector has a smaller number of entries than a dictionary for the second vector.

12. The one or more non-transitory storage media of claim 10, wherein the instructions includes instructions, that when executed by said one or more computing devices cause loading the first distinct value from a dictionary for the first vector and loading the second distinct value from said dictionary.

13. The one or more non-transitory storage media of claim 10, wherein loading the first distinct value includes loading the first distinct value after generating the first multiplicand.

14. The one or more non-transitory storage media of claim 10, wherein determining the first set of one or more values of the second vector comprises generating a bit mask that indicates which values of the second vector correspond to the first distinct value in the first vector.

15. The one or more non-transitory storage media of claim 10, wherein performing the summation over the first set of one or more values comprises:

loading, into a fourth vector, each value of the first set of one or more values;

performing a summation over the fourth vector.

16. The one or more non-transitory storage media of claim 10, wherein performing the summation over the first set of one or more values comprises accumulating, in a fourth vector, a running sum of the first set of one or more values.

17. The one or more non-transitory storage media of claim 10, wherein performing the summation over the first set of one or more values comprises:
- storing, in a fifth vector, a respective frequency value for each distinct value of the first set of one or more values, wherein a frequency value indicates a number of instances of a particular value in the first set of one or more values;
- generating a set of one or more products based on multiplying each distinct value of the first set of one or more values to a corresponding frequency value of the fifth vector;
- performing the summation over the set of one or more products.

18. The one or more non-transitory storage media of claim 17, wherein storing, in the fifth vector, a respective frequency value for each distinct value of the first set of one or more values comprises:
- performing a SIMD gather operation that retrieves, into a third register, a respective running frequency value for each value of multiple values loaded into the first register;
- performing a SIMD add operation that updates one or more running frequency values in the third register with one or more frequency values for the multiple values loaded into the first register;
- performing a SIMD scatter operation that stores, in the fifth vector, the one or more running frequency values updated in the third register.

19. A method comprising:
- storing, in a first vector, a subset of values from a column of a database table;
- storing, in a second vector, a first set of one or more frequency values, wherein each frequency value in the first set indicates a current number of instances computed for a respective distinct value in the first vector;
- performing a single instruction, multiple data (SIMD) load operation that loads, into a first register, a plurality of values from the first vector;
- performing a SIMD gather operation that retrieves, into a second register, one or more frequency values from the second vector;
- storing, in a third register, a second set of one or more frequency values, wherein each frequency value in the second set indicates a number of instances computed for a respective distinct value in the first register;
- performing a SIMD add operation that updates the one or more frequency values in the second register with the second set of one or more frequency values in the third register;
- performing a SIMD scatter operation that stores, in the second vector, the one or more frequency values updated in the second register;
- generating a set of one or more products based on multiplying each distinct value of the first vector to a corresponding frequency value of the second vector;
- performing a summation over the set of one or more products.

20. The method of claim 19, wherein the second vector is indexed to a dictionary for the first vector.

21. One or more non-transitory storage media storing instructions which, when executed by one or more computing devices, cause:
- storing, in a first vector, a subset of values from a column of a database table;
- storing, in a second vector, a first set of one or more frequency values, wherein each frequency value in the first set indicates a current number of instances computed for a respective distinct value in the first vector;
- performing a single instruction, multiple data (SIMD) load operation that loads, into a first register, a plurality of values from the first vector;
- performing a SIMD gather operation that retrieves, into a second register, one or more frequency values from the second vector;
- storing, in a third register, a second set of one or more frequency values, wherein each frequency value in the second set indicates a number of instances computed for a respective distinct value in the first register;
- performing a SIMD add operation that updates the one or more frequency values in the second register with the second set of one or more frequency values in the third register;
- performing a SIMD scatter operation that stores, in the second vector, the one or more frequency values updated in the second register;
- generating a set of one or more products based on multiplying each distinct value of the first vector to a corresponding frequency value of the second vector;
- performing a summation over the set of one or more products.

22. The one or more non-transitory storage media of claim 21, wherein the second vector is indexed to a dictionary for the first vector.

* * * * *